United States Patent
Nakamura et al.

(10) Patent No.: US 12,063,670 B2
(45) Date of Patent: Aug. 13, 2024

(54) METHOD FOR WIRELESS COMMUNICATION AND TERMINAL DEVICE THEREOF

(71) Applicants: SHARP KABUSHIKI KAISHA, Sakai (JP); FG Innovation Company Limited, Tuen Mun (HK)

(72) Inventors: Osamu Nakamura, Sakai (JP); Hiromichi Tomeba, Sakai (JP); Hideo Nanba, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 588 days.

(21) Appl. No.: 17/266,609

(22) PCT Filed: Aug. 6, 2019

(86) PCT No.: PCT/JP2019/030804
§ 371 (c)(1),
(2) Date: Feb. 7, 2021

(87) PCT Pub. No.: WO2020/031993
PCT Pub. Date: Feb. 13, 2020

(65) Prior Publication Data
US 2021/0307017 A1    Sep. 30, 2021

(30) Foreign Application Priority Data
Aug. 9, 2018   (JP) .................................. 2018-150661

(51) Int. Cl.
*H04W 72/53*       (2023.01)
*H04L 5/00*        (2006.01)
(Continued)

(52) U.S. Cl.
CPC ............ *H04W 72/53* (2023.01); *H04L 5/0012* (2013.01); *H04W 72/0446* (2013.01); *H04W 72/0453* (2013.01); *H04W 72/23* (2023.01)

(58) Field of Classification Search
CPC . H04W 72/53; H04W 72/23; H04W 72/0446; H04W 72/0453; H04L 5/0012
See application file for complete search history.

(56) References Cited

U.S. PATENT DOCUMENTS

2017/0289966 A1* 10/2017 Islam .................... H04W 72/21
2018/0219649 A1    8/2018 Ying et al.

FOREIGN PATENT DOCUMENTS

CN    101911555 A    12/2010
CN    107113660 A    8/2017
(Continued)

OTHER PUBLICATIONS

3GPP TS 38.211, "3rd Generation Partnership Project; Technical Specification Group Radio Access Network; NR; Physical channels and modulation (Release 15)", V15.1.0 (Mar. 2018).
(Continued)

*Primary Examiner* — Samina F Choudhry
(74) *Attorney, Agent, or Firm* — ScienBiziP, P.C.

(57) ABSTRACT

According to the present invention, transmission is efficiently and repeatedly performed within a slot. The number of repetitions in the slot is calculated using OFDM symbol allocation in a slot notified using a predetermined field during RRC signaling or DCI formatting and the number of divisions in the slot notified by the RRC signaling (or the number of OFDM symbols serving as repetition unit). When the calculated number of repetitions does not satisfy a predetermined condition, repeated transmission is not performed.

6 Claims, 6 Drawing Sheets

(51) Int. Cl.
  *H04W 72/0446* (2023.01)
  *H04W 72/0453* (2023.01)
  *H04W 72/23* (2023.01)

(56) References Cited

FOREIGN PATENT DOCUMENTS

| WO | WO-2015114700 A1 | * | 8/2015 | ........... H04L 1/1664 |
| WO | WO-2016159697 A1 | * | 10/2016 | ............ H04B 1/707 |
| WO | 2016182039 A1 | | 11/2016 | |
| WO | 2017130969 A2 | | 8/2017 | |
| WO | 2020/030013 A1 | | 2/2020 | |

OTHER PUBLICATIONS

Huawei, HiSilicon, Nokia, Nokia Shanghai Bell, "New SID on Physical Layer Enhancements for NR URLLC", 3GPP TSG-RAN #80 La Jolla, US, Jun. 11-14, 2018, RP-181477.
CMCC ; "Discussion on PUSCH repetition for grant-free transmission", R1-1804103; 3GPP TSG RAN WG1 Meeting #92bis, Sanya, China, Apr. 16-20, 2018, Section 2, figure 3.
Ericsson, "Discussion on SRS frequency hopping in NR" [online], 3GPP TSG RAN WGl #91 RI-1721385, Dec. 1, 2017, section 2.2.
NIT DOCOMO, INC., "UL data transmission procedure for June Release URLLC" [online], 3GPP TSG RAN WGl #93 RI-1807069, May 25, 2018, sections 2, 3.
Huawei et al., "Correction to repetition for configured grant", R2-1810583, 3GPP TSG-RAN WG2 Meeting#AH1807, Montreal, Canada, Jul. 2-6, 2018 (Jun. 22, 2018).

* cited by examiner

METHOD FOR WIRELESS COMMUNICATION AND TERMINAL DEVICE THEREOF

FIELD

The present disclosure relates to a terminal device, base station device and communication methods thereof. The present disclosure claims the benefit of and priority to Japanese Patent Application No. 2018-150661 ("the '661 application"), filed on Aug. 8, 2018. The content(s) of the '661 application is fully incorporated herein by reference for all purposes.

BACKGROUND

In an LTE (Long Term Evolution) communication system specified by 3GPP (Third Generation Partnership Project), a DCI (Downlink Control Information, grant) is notified from a base station device to a terminal device, and the dynamic scheduling of data transmission based on the notified DCI is specified. In the dynamic scheduling, when one DCI is received, one transmission is performed. On the other hand, in addition to dynamic scheduling, SPS (Semi-Persistent Scheduling) for periodically allocating wireless resources is specified. In SPS, even when one DCI is received, periodic wireless resource allocation is performed, so that data transmission may be performed multiple times.

Currently in 3GPP, eMBB (enhanced Mobile Broadband), URLLC (Ultra-Reliable and Low Latency Communications), and mMTC (massive Machine-Type Communications) are used as examples for standardizing the fifth generation mobile communications (New Radio, NR). In NR, the CS (Configured scheduling) extended from the LTE SPS is standardized. In CS, transmission of repeated slots can be performed, and the reliability of transmission can be improved.

Moreover, the discussions on repetition within slots, not on repetition of slots, was held in 3GPP (Non-Patent Document 2).

PRIOR ART DOCUMENTS

Non-Patent Literature

Non-Patent Literature 1: 3GPP TS38.211, V15.1.0, "Physical channels and modulation (Release 15)."
Non-Patent Literature 2: Huawei, Hisilicon, Nokia, Nokia Shanghai Bell, "SID on Physical Layer Enhancements for NR URLLC," RP-181477.

SUMMARY

Problems to Be Addressed

Although studies on repetition within a slot in 3GPP are performed, it is not yet disclosed how the control is performed within the slot. However, performing repetition within a slot requires a control signal in the terminal device and the base station device to be specified, and transmitted via the control signal.

An aspect of the present disclosure is implemented in view of such circumstances, and an object thereof is to provide a control method for performing repetition within a slot.

Technology Aspects

For addressing the above problems, an aspect of a communications device and a communication method of the present disclosure is provided with the following details.

(1) An aspect of the present disclosure is a terminal device communicating with a base station device, comprising a receiving unit that receives information related to RRC signaling or Orthogonal Frequency Division Multiplexing (OFDM) symbol allocation in a slot included in DCI, wherein the terminal device is characterized in that, the receiving unit receives the RRC signaling comprising information related to a number of repetitions in consecutive slots and information related to a number of divisions in a slot as a parameter, wherein the receiving unit comprises: a control unit that calculates the number of repetitions in a slot from the information related to OFDM symbol allocation in the slot and the information related to the division, and forms a transport block in the OFDM symbol divided according to the number of divisions; and, a transmitting unit that repeatedly transmits the transport block in the slot according to the number of repetitions in the slot.

(2) In an aspect of the present disclosure, when the number of repetitions in the slot calculated from the information related to OFDM symbol allocation in the slot and the information related to the division does not satisfy a predetermined condition, the number of repetitions in the slot is set to 1.

(3) In an aspect of the present disclosure, the parameter includes a setting related to frequency hopping, and when the value of the parameter is valid, the number of repetitions in the slot is transmitted during frequency hopping.

(4) An aspect of the present disclosure is a base station device that communicates with a terminal device, comprising a transmitting unit that transmits information related to RRC signaling or OFDM symbol allocation in a slot included in DCI, wherein the base station device comprises a transmitting unit that transmits the RRC signaling comprising information related to a number of repetitions in consecutive slots and information related to a number of divisions in a slot as a parameter.

Effects

According to one or more methods of the present disclosure, the base station device and the terminal device may optionally perform repetition within a slot.

DESCRIPTION

The communications system according to the present disclosure includes a base station device (cell, small cell, serving cell, component carrier, eNodeB, Home eNodeB, gNodeB) and a terminal device (terminal, mobile terminal, UE: User Equipment). In the communications system, when in the condition of downlink, the base station device becomes a transmitting device (transmitting point, transmitting antenna group, transmitting antenna port group, TRP (Tx/Rx Point)), and the terminal device becomes a receiving device (receiving point, receiving terminal, receiving antenna group, receiving antenna port group). In the condition of uplink, the base station device becomes a receiving device, and the terminal device becomes a transmitting device. The disclosed communications system may also be applicable to D2D (Device-to-Device, sidelink) communications. In this situation, both the transmitting device and the receiving device are terminal devices.

The disclosed communications system is not limited to data communications between a terminal device and a base station device with human interventions. In other words, the communications system may also be applicable in forms of data communication without human interventions, such as MTC (Machine Type Communication), M2M communications (Machine-to-Machine Communications), IoT (Internet of Things) communications, NB-IoT (Narrow Band-IoT), etc. (hereinafter referred to as MTC). In this situation, the terminal device is an MTC terminal. The disclosed communications system may use a multi-carrier transmission method, such as CP-OFDM (Cyclic Prefix-Orthogonal Frequency Division Multiplexing), in uplink and downlink. The disclosed communications system may also use a transmission method such as DFTS-OFDM (Discrete Fourier Transform Spread-Orthogonal Frequency Division Multiplexing, also referred to as SC-FDMA) in the uplink. Additionally, the following paragraphs provide disclosures to using OFDM transmission method in the uplink and the downlink. However, the present disclosure is not limited to this, and other transmission methods can be applied.

The base station device and the terminal device according to the present disclosure may communicate using a frequency band of a licensed band (licensed band) and/or an unlicensed band. The licensed band refers to a frequency band that has obtained a license (permit) for use from the country or region where the wireless carrier provides the service. The unlicensed band refers to a frequency band that does not require a license (permit) from the country or region.

In the present disclosure, "X/Y" includes the meaning of "X or Y." In the present disclosure, "X/Y" includes the meaning of "X and Y." In the present disclosure, "X/Y" includes the meaning of "X and/or Y."

1. First Implementation

Figure 1:
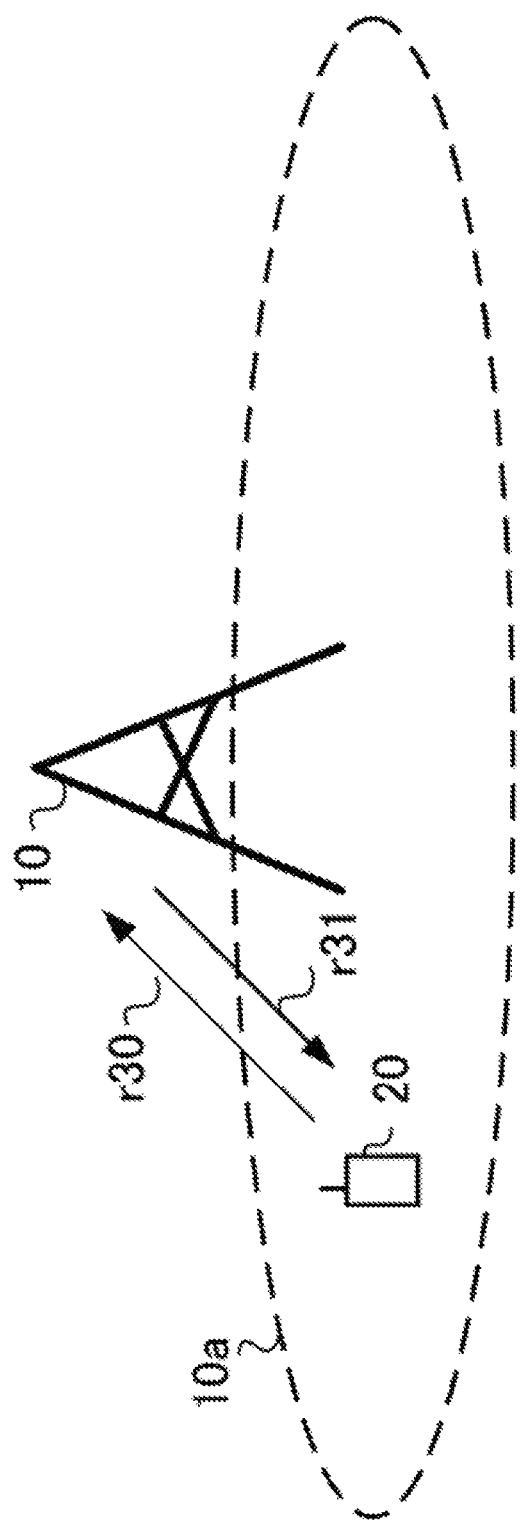
FIG. 1 is a schematic diagram of a communication system 1 according to a first aspect of the present disclosure.

FIG. 1 is a schematic diagram of a communication system 1 according to the present disclosure. The communications system 1 according to the first implementation includes a base station device 10 and a terminal device 20. The coverage 10a is a range (communication area) in which the base station device 10 can connect (communicate) with the terminal device 20 (also referred to as a cell). Additionally, the base station device 10 may accommodate a plurality of terminal devices 20 in the coverage 10a.

In FIG. 1, the uplink wireless communication r30 includes at least the following uplink physical channels. The uplink physical channel is used for transmitting information output from a higher layer.

Physical uplink control channel (PUCCH)
Physical uplink shared channel (PUSCH)
Physical random access channel (PRACH)

PUCCH is a physical channel used to transmit uplink control information (UCI). The uplink control information includes an acknowledgment (positive acknowledgment, ACK)/negative acknowledgment (Negative acknowledgement, NACK) for downlink data. Additionally, the downlink data indicates downlink transport block, Medium Access Control Protocol Data Unit (MAC PDU), Downlink-Shared Channel (DL-SCH), Physical Downlink Shared Channel (PDSCH), and the like. ACK/NACK may also be referred to as HARQ-ACK (Hybrid Automatic Repeat Request Acknowledgement), HARQ feedback, HARQ response, or HARQ control information, and a signal indicating delivery confirmation.

NR supports at least five formats, including: PUCCH Format 0, PUCCH Format 1, PUCCH Format 2, PUCCH Format 3, and PUCCH Format 4. PUCCH Format 0 and PUCCH Format 2 are composed of 1 or 2 OFDM symbols, and the other PUCCH Formats are composed of 4 to 14 OFDM symbols. Furthermore, the PUCCH Format 0 and the PUCCH Format 1 are composed of 12 subcarriers in bandwidth. Additionally, in PUCCH Format 0, a 1-bit (or 2-bit) ACK/NACK is transmitted using resource elements of 12 subcarriers and 1 OFDM symbol (or 2 OFDM symbols).

The uplink control information includes a scheduling request (SR) used to request a PUSCH (Uplink-Shared Channel, UL-SCH) resource for initial transmission. The scheduling request indicates requesting UL-SCH resources for the initial transmission.

Uplink control information includes downlink channel state information (CSI). The downlink channel state information includes a rank indicator (RI) indicating a preferred number of spatial multiplexing (number of layers), a precoding matrix indicator (PMI) indicating a preferred precoder, a preferred transmission rate indicating a channel quality indicator (CQI). The PMI indicates a codebook determined by the terminal device. The codebook relates to the precoding of a physical downlink shared channel.

In NR, a higher layer parameter RI restriction may be set. There are a plurality of setting parameters in the RI restriction, including a Type 1 single panel RI restriction being composed of 8 bits. A bitmap parameter of the Type 1 single panel RI restriction forms a bit sequence $r_7 \ldots r_2, r_1$. Here, $r_7$ is an MSB (Most Significant Bit), and $r_0$ is an LSB (Least Significant Bit). When $r_i$ is zero (i is 0, 1 . . . 7), PMI and RI reporting corresponding to the precoder associated with the i+1 layer is not allowed. In addition to Type 1 single panel RI restriction, the RI restriction includes a Type 1 multi-panel RI restriction that is composed of 4 bits. Being a bitmap parameter of the Type 1 multi-panel RI restriction forms a bit sequence $r_4, r_3, r_2, r_1$. Here, $r_4$ is the MSB and $r_0$ is the LSB. When $r_i$ is zero (i is 0, 1, 2, 3), PMI and RI reporting corresponding to the precoder associated with the i+1 layer is not allowed.

The CQI may use a preferred modulation scheme (for example, QPSK, 16 QAM, 64 QAM, 256 QAMAM, etc.) in a predetermined band, a coding rate, and an index (CQI index) indicating frequency use efficiency. The terminal device selects, from the CQI table, a CQI index that can be received without the transport block of the PDSCH exceeding the block error probability (BLER) of 0.1. When a predetermined CQI table is set by higher layer signaling, a CQI index that can be received without exceeding BLER 0.000001 is selected from the CQI table.

The PUSCH is a physical channel used for transmitting uplink data (Uplink Transport Block, Uplink-Shared Channel, UL-SCH), which is a transmission method, Cyclic Prefix (CP)-OFDM or DFT-S-OFDM may be applied. The PUSCH may be used to transmit HARQ-ACK and/or channel state information for downlink data together with the uplink data. PUSCH may also be used to transmit only channel state information. The PUSCH may be used to transmit only HARQ-ACK and channel state information.

The PUSCH is used to transmit radio resource control (RRC) signaling. RRC signaling may also be referred to as RRC message/RRC layer information/RRC layer signal/RRC layer parameter/RRC information element. RRC signaling is information/signals processed in the radio resource control layer. RRC signaling transmitted from the base station device may be signaling common to a plurality of terminal devices in the cell. The RRC signaling transmitted from the base station device may be dedicated signaling (also referred to as dedicated signaling) for a certain terminal device. That is, user device specific (user device specific) information is transmitted to a certain terminal device using dedicated signaling. The RRC message may include the UE Capability of the terminal device. The UE Capability is information indicating a function supported by the terminal device.

The PUSCH is used to transmit a MAC CE (Medium Control Element). The MAC CE is information/signal processed (transmitted) in the Medium Access Control layer. For example, power headroom may be included in the MAC CE and reported via a physical uplink shared channel. That is, the MAC CE field may be used to indicate the power headroom level. Uplink data may include an RRC message or MAC CE. The RRC signaling and/or MAC CE may be referred to as higher layer signaling. The RRC signaling and/or MAC CE may be included in the transport block.

The PRACH is used to transmit a preamble used for random access. The PRACH is used to transmit a random access preamble. The PRACH is used to indicate an initial connection establishment procedure, a handover procedure, a connection re-establishment procedure, synchronization (timing adjustment) for uplink transmission, and a request for PUSCH (UL-SCH) resources.

In uplink wireless communication, an uplink reference signal (UL RS) is used as an uplink physical signal. The uplink physical signal is not used for transmitting information output from the higher layer, but is used by the physical layer. The uplink reference signal includes a demodulation reference signal (DMRS) and a sounding reference signal (SRS). DMRS is related to the transmission of the physical uplink shared channel/physical uplink control channel. For example, when demodulating a physical uplink shared channel/physical uplink control channel, the base station device 10 uses a demodulation reference signal to perform transmission path estimation/transmission path correction.

The SRS is not related to the transmission of the physical uplink shared channel/physical uplink control channel. The base station device 10 uses the SRS to measure the uplink channel state (CSI Measurement).

In FIG. 1, at least the following downlink physical channels are used in the wireless communication of the downlink r31. The downlink physical channel is used for transmitting information output from a higher layer.

Physical broadcast channel (PBCH)
Physical downlink control channel (PDCCH)
Physical downlink shared channel (PDSCH)

The PBCH is used to broadcast a master information block (MIB, Broadcast Channel, BCH) commonly used in the terminal devices. The MIB is one type of system information. For example, the MIB includes a downlink transmission bandwidth setting and a system frame number (SFN). The MIB may include at least a part of information indicating a slot number in which the PBCH is transmitted, a subframe number, and a radio frame number.

The PDCCH is used to transmit downlink control information (DCI). In the downlink control information, a plurality of formats (also referred to as DCI formats) may be defined based on applications. The DCI format may be defined based on the type of DCI and the number of bits constituting one DCI format. Each format is used according to the application. The downlink control information includes control information for transmitting downlink data and control information for transmitting uplink data. The DCI format for downlink data transmission may also be referred to as downlink assignment (or downlink grant). The DCI format for uplink data transmission may also be referred to as uplink grant (or uplink assignment).

One downlink assignment is used for scheduling one PDSCH in one serving cell. The downlink grant may be used at least for scheduling the PDSCH in the same slot as that used for transmitting the downlink grant. The downlink assignment includes resource block allocation used for PDSCH, MCS (Modulation and Coding Scheme) for PDSCH, NDI (NEW Data Indicator) indicating initial transmission or retransmission, information indicating HARQ process number in downlink, downlink control information such as redundancy version indicating the amount of redundancy appended to the codeword during error correction encoding. A codeword is data after error correction coding. The downlink assignment may include a transmission power control (TPC) instruction for the PUCCH and a TPC instruction for the PUSCH. The uplink grant may include a repetition number indicating the number of times the PUSCH is repeatedly transmitted. Additionally, the DCI format used for each downlink data transmission includes information (field) necessary for its use among the above information.

One uplink grant is used to notify a terminal device of scheduling of one PUSCH in one serving cell. The uplink grant includes information related to resource block allocation for PUSCH transmission (resource block allocation and frequency hopping resource allocation), information related to the MCS of a PUSCH (MCS/Redundancy version), information related to a DMRS port, information related to retransmission of a PUSCH, uplink control information such as a TPC instruction for a PUSCH and a channel state information (CSI) request (CSI request) for downlink. The uplink grant may include information indicating the HARQ process number in the uplink, a transmission power control (TPC) instruction for the PUCCH, and a TPC instruction for the PUSCH. Additionally, the DCI format used for each uplink data transmission includes information (field) necessary for its use among the above information.

The PDCCH is generated by appending a cyclic redundancy check (CRC) to the downlink control information. In the PDCCH, CRC parity bits are scrambled (also referred to as an exclusive-OR operation, or a mask) using a predetermined identifier. The parity bits are scrambled with a C-RNTI (Cell-Radio Network Temporary Identifier), a CS (Configured Scheduling)-RNTI, a Temporary C-RNTI, P (Paging)-RNTI, a SI (System Information)-RNTI, or an RA (Random Access)-RNTI. The C-RNTI and CS-RNTI are identifiers for identifying a terminal device in a cell. The Temporary C-RNTI is an identifier for identifying a terminal device that transmitted a random access preamble during a contention based random access procedure. The C-RNTI and Temporary C-RNTI are used to control PDSCH transmission or PUSCH transmission in a single subframe. The CS-RNTI is used for periodically allocating PDSCH or PUSCH resources. The P-RNTI is used to transmit a paging message (Paging Channel, PCH). The SI-RNTI is used for transmitting a System Information Block (SIB), and the RA-RNTI is used for transmitting a random access response (message 2 in a random access procedure).

The PDSCH is used to transmit downlink data (downlink transport block, DL-SCH). The PDSCH is used to transmit a system information message (also referred to as a SIB). Part or all of the SIB may be included in the RRC message.

The PDSCH is used to transmit RRC signaling. The RRC signaling transmitted from the base station device may be common to a plurality of terminal devices in the cell (cell-specific). That is, the information common to the user devices in the cell is transmitted using cell-specific RRC signaling. The RRC signaling transmitted from the base station device may be a message dedicated to a certain terminal device (also referred to as dedicated signaling). That is, user device specific information is transmitted to a certain terminal device using a dedicated message.

The PDSCH is used to transmit a MAC CE. The RRC signaling and/or MAC CE are also referred to as higher layer signaling. The Physical Multicast Channel (PMCH) is used to transmit multicast data (Multicast Channel, MCH).

In the downlink wireless communication of FIG. 1, a synchronization signal (SS) and a downlink reference signal (DL RS) are used as downlink physical signals. The downlink physical signal is not used for transmitting information output from a higher layer, but is used by the physical layer.

The synchronization signal is used by the terminal device to synchronize the downlink frequency domain and the time domain. The downlink reference signal is used by the terminal device to perform transmission path estimation/transmission path correction of a downlink physical channel. For example, the downlink reference signal is used for demodulating the PBCH, PDSCH, and PDCCH. The downlink reference signal may also be used by the terminal device to measure the downlink channel state (CSI measurement).

The downlink physical channel and downlink physical signal may collectively be referred to as a downlink signal. Furthermore, the uplink physical channel and the uplink physical signal may collectively be referred to as an uplink signal. Furthermore, the downlink physical channel and the uplink physical channel may collectively be referred to as a physical channel. Furthermore, the downlink physical signal and the uplink physical signal may collectively be referred to as a physical signal.

The BCH, UL-SCH and DL-SCH are transport channels. The channels used in the MAC layer may be referred to as transport channels. The unit of the transport channel used in the MAC layer may also be referred to a transport block (TB) or a MAC PDU (Protocol Data Unit). The transport block is a data unit that the MAC layer transfers (delivers) to the physical layer. In the physical layer, transport blocks are mapped to codewords, and encoding processing is performed for each codeword.

Figure 2:
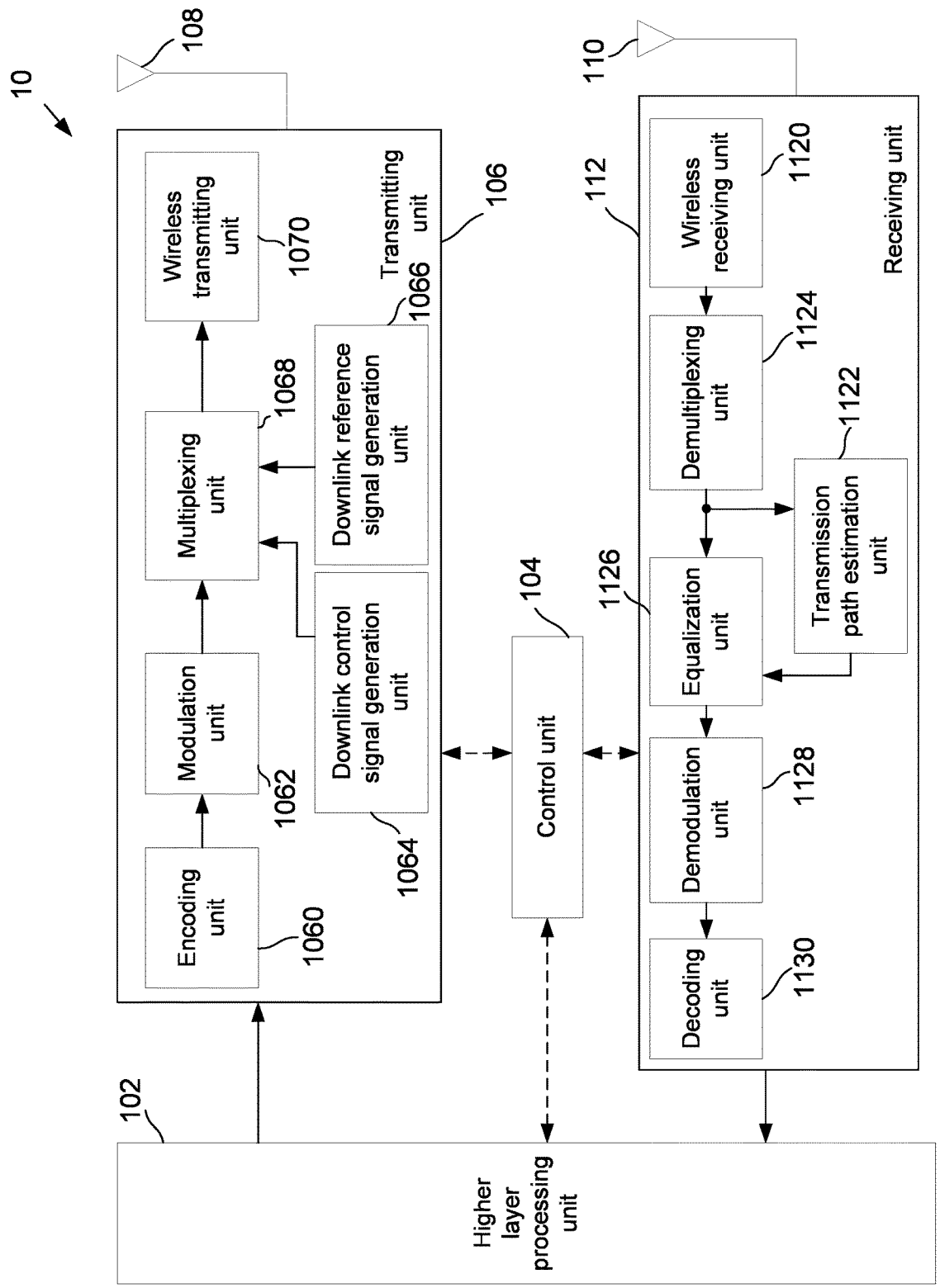
FIG. 2 is a schematic diagram of a base station device according to a first aspect of the present disclosure.

FIG. 2 is a schematic diagram of a base station device 10 according to the present disclosure. The base station device 10 includes a higher layer processing unit (higher layer processing step) 102, a control unit (controlling step) 104, a transmission/transmitting unit (transmitting step) 106, a transmission antenna 108, a reception antenna 110, and a receiving unit (receiving step) 112. The transmission unit 106 generates a physical downlink channel according to the logical channel input from the higher layer processing unit 102. The transmission unit 106 includes an encoding unit (encoding step) 1060, a modulation unit (modulating step) 1062, a downlink control signal generation unit (downlink control signal generating step) 1064, a downlink reference signal generation unit (downlink reference signal generating step) 1066, a multiplexing unit (multiplexing step) 1068, and wireless transmission unit (wireless transmitting step) 1070. The receiving unit 112 detects (demodulation, decoding, etc.) a physical uplink channel and outputs the content to the higher layer processing unit 102. The receiving unit 112 includes a wireless receiving unit (wireless receiving step) 1120, a transmission path estimation unit (transmission path estimating step) 1122, a demultiplexing unit (multiplexing/demultiplexing step) 1124, an equalization unit (equalizing step) 1126, a demodulation unit (demodulating step) 1128 and a decoding unit (decoding step) 1130.

The higher layer processing unit 102 includes a medium access control (MAC) layer, a packet data convergence protocol (PDCP) layer, a radio link control (RLC) layer, and a radio resource control (RRC) layer and other layers higher than the physical layer. The higher layer processing unit 102 generates information for controlling the transmission unit 106 and the receiving unit 112, and outputs the information to the control unit 104. The higher layer processing unit 102 outputs downlink data (DL-SCH etc.), system information (MIB, SIB) to the transmission unit 106. Furthermore, the DMRS configuration information may not be notified based on a higher layer such as RRC, and is notified to the terminal device by system information (MIB or SIB).

The higher layer processing unit 102 generates or acquires from a higher node the broadcasting system information (a part of MIB or SIB). The higher layer processing unit 102 outputs the broadcasting system information to the transmission unit 106 as BCH/DL-SCH. The MIB is configured on the PBCH in the transmission unit 106. The SIB is configured on the PDSCH in transmission unit 106. The higher layer processing unit 102 generates or acquires from a higher node the system information (SIB) specific to the terminal device. The SIB is configured on the PDSCH in the transmission unit 106.

The higher layer processing unit 102 sets various RNTIs for each terminal device. The RNTI is used for encryption (scrambling) of the PDCCH, PDSCH, and the like. The higher layer processing unit 102 outputs the RNTI to the control unit 104/the transmission unit 106/the receiving unit 112.

In the situation when the downlink data (transport block, DL-SCH) configured on the PDSCH, the system information (System Information Block, SIB) specific to terminal device, the RRC message, the MAC CE, and the DMRS configuration information are not notified as DCI by the SIB, MIB or the system information alike, the higher layer processing unit 102 generates or acquires from a higher node the DMRS configuration information and outputs the DMRS configuration information to the transmission unit 106. The higher layer processing unit 102 manages various setting information of the terminal device 20. Furthermore, a part of the functions of the radio resource control may be performed in the MAC layer or the physical layer.

The higher layer processing unit 102 receives from the terminal device 20 (via the receiving unit 112) information related to the terminal device such as functions (UE capability) supported by the terminal device. The terminal device 20 transmits its functions to the base station device 10 via a higher layer signal (RRC signaling). The information transmitted by the terminal device includes information indicating whether the terminal device supports a predetermined function, or information indicating that the terminal device has completed the implementation and testing for a predetermined function. The determination of whether a predetermined function is supported includes determining whether the implementation and testing for the predetermined function has been completed.

If the terminal device supports a predetermined function, the terminal device transmits information (parameter) indicating whether the terminal device supports the predetermined function. If the terminal device does not support the predetermined function, the terminal device may not transmit information (parameter) indicating whether the terminal device supports the predetermined function. That is, whether a predetermined function is supported is notified by transmitting or not transmitting information (parameter) indicating whether the predetermined function is supported. Furthermore, the information (parameter) indicating whether a predetermined function is supported may be notified using one bit of 1 or 0.

The higher layer processing unit 102 acquires the DL-SCH from the decoded uplink data (further including the CRC) from the receiving unit 112. The higher layer processing unit 102 performs error detection on the uplink data transmitted by the terminal device. For example, the error detection is performed in the MAC layer.

The control unit 104 controls the transmission unit 106 and the receiving unit 112 based on various setting information input from the higher layer processing unit 102/the receiving unit 112. The control unit 104 generates downlink control information (DCI) based on the setting information input from the higher layer processing unit 102/the receiving unit 112 and outputs the downlink control information (DCI) to the transmission unit 106. For example, the control unit 104 takes the setting information (DMRS Configuration 1 or DMRS Configuration 2) related to the DMRS that is input from the higher layer processing unit 102/the receiving unit 112 into consideration and sets the frequency configuration of the DMRS (for DMRS Configuration 1, the even subcarrier or the odd subcarrier; for DMRS configuration 2, any one of the 0th to the 2nd sets), and generates the DCI.

The control unit 104 determines the MCS of the PUSCH while taking the channel quality information (CSI Measurement result) measured by the transmission path estimation unit 1122 into consideration. The control unit 104 determines an MCS index corresponding to the MCS of the PUSCH. The control unit 104 includes the determined MCS index in the uplink grant.

The transmission unit 106 generates a PBCH, PDCCH, PDSCH, downlink reference signal according to the signal input from the higher layer processing unit 102/the control unit 104. The encoding unit 1060 uses a predetermined encoding method determined by the higher layer processing unit 102 and performs encoding (including repetition), such as block encoding, convolutional encoding, turbo encoding, polar encoding, LDPC coding, on the BCH, DL-SCH input from the higher layer processing unit 102. The encoding unit 1060 punctures the encoded bits based on the coding rate input from the control unit 104. The modulation unit 1062 modulates the encoded bits input from the encoding unit 1060 with a predetermined modulation scheme (modulation order) such as BPSK, QPSK, 16 QAM, 64 QAM, or 256 QAM, or a modulation scheme input from the control unit 104. Furthermore, the modulation order is based on the MCS index selected by the control unit 104.

The downlink control signal generation unit 1064 appends a CRC to the DCI input from the control unit 104. The downlink control signal generation unit 1064 performs encryption (scrambling) on the CRC using the RNTI. Furthermore, the downlink control signal generation unit 1064 performs QPSK modulation on the DCI with the appended CRC, and generates a PDCCH. The downlink reference signal generation unit 1066 generates a sequence known by the terminal device as a downlink reference signal. The known sequence is obtained by a predetermined rule based on a physical cell identifier for identifying the base station device 10.

The multiplexing unit 1068 multiplexes the modulation symbol of each channel input from the PDCCH/the downlink reference signal/the modulation unit 1062. In other words, the multiplexing unit 1068 maps the modulation symbols of the PDCCH/the downlink reference signal/each channel to a resource element. The mapped resource elements are controlled by the downlink scheduling input from the control unit 104. A resource element is the smallest unit of a physical resource including one OFDM symbol and one subcarrier. Furthermore, when performing Multi-Input Multi-Output (MIMO) transmission, the transmission unit 106 includes the encoding unit 1060 and the modulation unit 1062 of a plurality layers. In this situation, the higher layer processing unit 102 sets an MCS for each transport block of each layer.

The wireless transmission unit 1070 performs an inverse fast Fourier transform (IFFT) on the multiplexed modulation symbols to generate OFDM symbols. The wireless transmission unit 1070 appends a cyclic prefix (CP) to the OFDM symbol to generate a baseband digital signal. Furthermore, the wireless transmission unit 1070 converts the digital signal into an analog signal, removes undesirable frequency components by filtering, up-converts to the transmission frequency, amplifies power, and outputs the resulting signal to the transmission antenna 108 for transmission.

The receiving unit 112 detects (separates, demodulates, and decodes) a received signal received from the terminal device 20 via the receiving antenna 110 according to an instruction from the control unit 104, and outputs the decoded data to the higher layer processing unit 102/the control unit 104. The wireless receiving unit 1120 converts the uplink signal received via the receiving antenna 110 into a baseband signal by down-conversion, removes undesirable frequency components, suitably controls the amplification of the signal level, quadrature-demodulates based on the in-phase and quadrature components of the received signal, and converts the quadrature-demodulated analog signal into a digital signal. The wireless receiving unit 1120 removes a portion corresponding to the CP from the converted digital signal. The wireless receiving unit 1120 performs fast Fourier transform (FFT) on the signal from which the CP has been removed, and extracts a signal in the frequency domain. The signal of the frequency domain is output to the demultiplexing unit 1124.

The demultiplexing unit 1124 converts a signal input from the wireless receiving unit 1120 into a PUSCH, a PUCCH and an uplink reference signal based on the uplink scheduling information (uplink data channel allocation information etc.) input from the control unit 104. The separated uplink reference signal is input to the transmission path estimation unit 1122. The separated PUSCH and PUCCH are output to the equalization unit 1126.

The transmission path estimation unit 1122 estimates frequency response (or delay characteristic curve) using the uplink reference signal. The frequency response results, which is estimated by the transmission path and used for demodulating, is input to the equalization unit 1126. The transmission path estimation unit 1122 uses the uplink reference signal to measure the uplink channel status (Reference Signal Received Power, RSRP), RSRQ (Reference Signal Received Quality), and RSSI (Received Signal Strength Indicator). The measurement of the uplink channel condition is used for determining the MCS for the PUSCH and the like.

The equalization unit 1126 performs the following processes, specifically compensating for the effects on the transmission path from the frequency response input from the transmission path estimation unit 1122. For the compensation method, any suitable channel compensation, such as multiplying by the Minimum Mean Square Error (MMSE) weightings or the Maximal Ratio Combining (MRC) weightings, or applying the Maximum Likelihood Demodulation (MLD), may be applied. The demodulation unit 1128 performs a demodulation process based on information related to a modulation scheme predetermined/instructed by the control unit 104.

The decoding unit 1130 performs a decoding process on the signal output from the demodulation unit based on the predetermined coding rate/coding rate information specified by the control unit 104. The decoding unit 1130 outputs the decoded data (UL-SCH etc.) to the higher layer processing unit 102.

Figure 3:
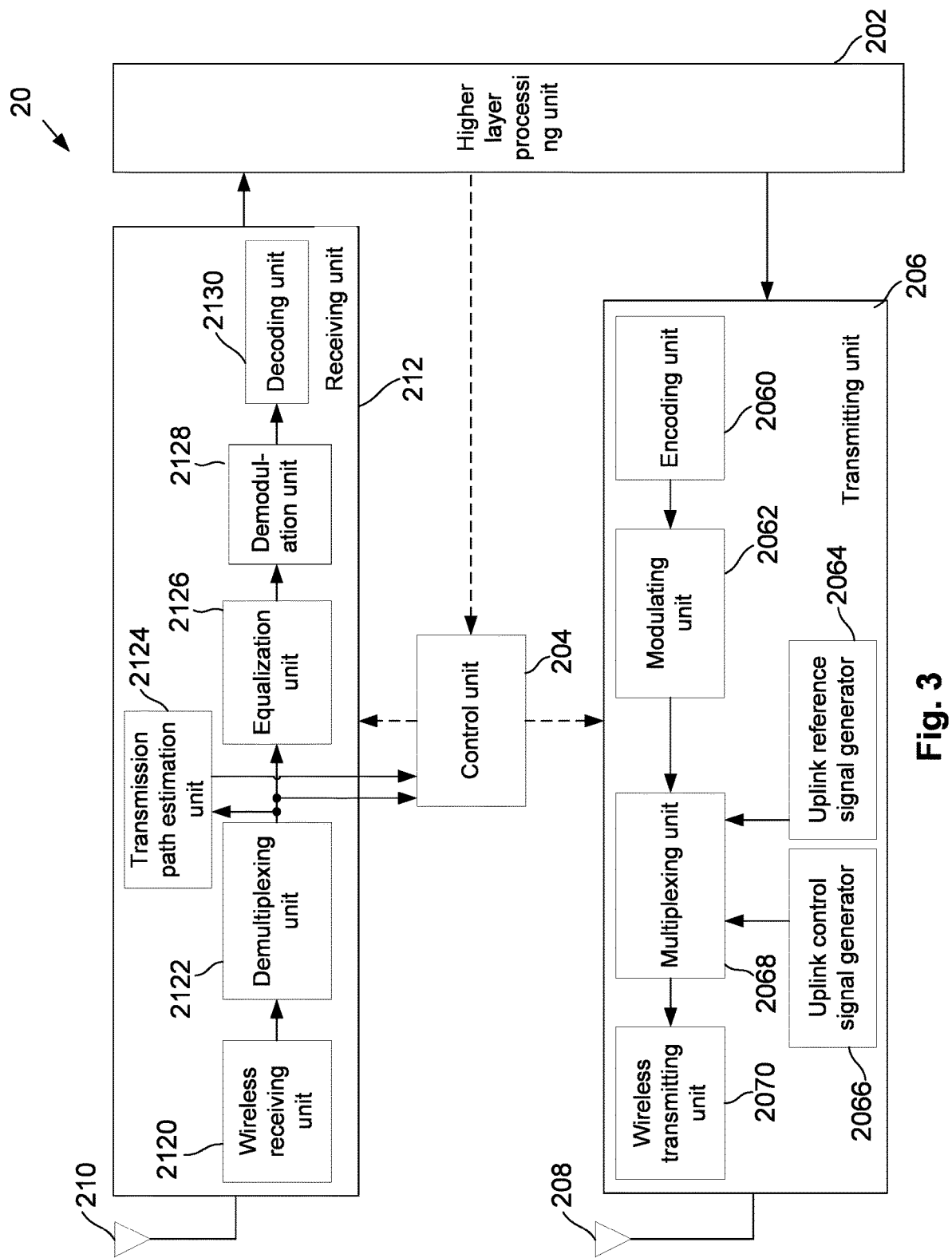
FIG. 3 is a schematic diagram of a terminal device according to a first aspect of the present disclosure.

FIG. 3 is a schematic diagram of a terminal device 20 according to the present disclosure. The terminal device 20 includes a higher layer processing unit (upper layer processing step) 202, a control unit (controlling step) 204, a transmission unit (transmitting step) 206, a transmission antenna 208, a receiving antenna 210, and a receiving unit (receiving step) 212.

The higher layer processing unit 202 performs processing of a medium access control (MAC) layer, a packet data integration protocol (PDCP) layer, a radio link control (RLC) layer, and a radio resource control (RRC) layer. The higher layer processing unit 202 manages various setting information of its own terminal device. The higher layer processing unit 202 notifies the base station device 10 of information (UE Capability) indicating the functions of the terminal device supported by the terminal device via the transmitting unit 206. The higher layer processing unit 202 notifies the UE Capability by RRC signaling.

The higher layer processing unit 202 acquires the decoded data such as DL-SCH and BCH from the receiving unit 212. The higher layer processing unit 202 generates HARQ-ACK according to the error detection result of the DL-SCH. The higher layer processing unit 202 generates an SR. The higher layer processing unit 202 generates UCI including HARQ-ACK/SR/CSI (including CQI report). Furthermore, when the DMRS configuration information is notified by the higher layer, the higher layer processing unit 202 outputs information related to the DMRS configuration to the control unit 204. The higher layer processing unit 202 outputs the UCI and UL-SCH to the transmitting unit 206. Additionally, a part of the functions of the higher layer processing unit 202 may be included in the control unit 204.

The control unit 204 interprets the downlink control information (DCI) received via the receiving unit 212. The control unit 204 controls the transmitting unit 206 according to the PUSCH scheduling/the MCS index/Transmission Power Control (TPC) acquired from the DCI for uplink transmission. The control unit 204 controls the receiving unit 212 according to the PDSCH scheduling/the MCS index acquired from the DCI for downlink transmission. Furthermore, the control unit 204 determines the frequency configurations of the DMRS according to the information on the frequency configurations of the DMRS included in the DCI for downlink transmission and the DMRS configuration information input from higher layer processing unit 202.

The transmitting unit 206 includes an encoding unit (encoding step) 2060, a modulation unit (modulating step) 2062, an uplink reference signal generator (uplink reference signal generating step) 2064, an uplink control signal generator (uplink control signal generating step) 2066, a multiplexing unit (multiplexing step) 2068, and a wireless transmitting unit (wireless transmitting step) 2070.

The encoding unit 2060 performs convolutional encoding, block encoding and turbo encoding on the uplink data (UL-SCH) input from the higher layer processing unit 202 according to the control of the control unit 204 (according to the coding rate calculated based on the MCS index).

The modulating unit 2062 modulates the encoded bits input (generates modulation symbol for the PUSCH) from the encoding unit 2060 using a modulation scheme predetermined for each modulation scheme/channel specified by the control unit 204, such as BPSK, QPSK, 16 QAM, 64 QAM, 256QAM.

The uplink reference signal generator 2064 generates a sequence determined by a predetermined rule (formula) according to instructions from the control unit 204 and uses a physical cell identity (PCI, referred to as Cell ID, etc.) for identifying the base station device 10, a bandwidth for an uplink reference signal configuration, a cyclic shift, a parameter value for generating a DMRS sequence, and a frequency configuration as basis.

The uplink control signal generator 2066 encodes UCI, performs BPSK/QPSK modulation, and generates a modulation symbol for PUCCH according to instructions from the control unit 204.

The multiplexing unit 2068 performs multiplexing on the modulation symbol of the PUSCH for each transmission antenna port (DMRS port), the modulation symbol of PUCCH, and an uplink reference signal according to uplink scheduling information from the control unit 204 (transmission interval in uplink configured scheduling (CS) included in RRC message, resource allocation included in DCI, etc.) (In other words, each signal is mapped to a resource element).

Herein, CS is described. There exists an RRC parameter, like repK, as an information element of ConfiguredGrantConfig that is also RRC information for performing CS. The parameter repK is for setting the number of repetitive transmissions in successive slots, and one of 1 time, 2 times, 4 times, and 8 times may be selected. However, when the RRC parameter does not exist, the number of repetitions is set to 1 and the transmission is performed.

Figure 4:
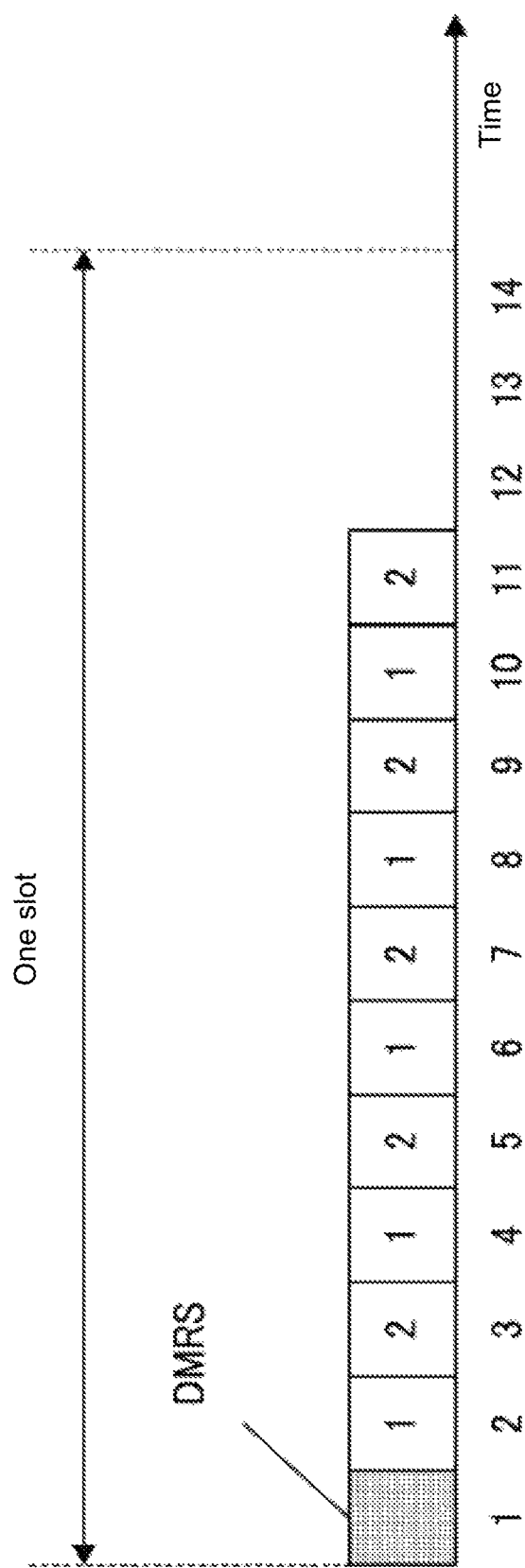
FIG. 4 is a slot schematic diagram illustrating the number of OFDM symbols in a slot is 10 and a repetition unit is 2 according to a first aspect of the present disclosure.

In Rel-15, the repetition of a slot is performed, and the repetition of transmission within a slot is described. As one of the methods for realizing repetition within a slot, there exists a method of specifying the number of OFDM serving as repetition units using higher layer signaling such as RRC signaling. For example, as illustrated in FIG. 4, the situation that the use of the second to the eleventh OFDM symbols in the OFDM symbols within the slot via RRC signaling indicating the time domain allocation or DCI notification is considered. For example, when the RRC parameter related to the number of OFDMs serving as repetition units is set to 2, the control unit of the terminal device divides 10 OFDM symbols into 2 symbols in each division, and performs transmission repetition five times. In other words, unlike the conventional case, the CRC is included in the 2 OFDM symbols for transmission, so that the CRC is transmitted five times in one slot. Additionally, the number notified from the base station device to the terminal device via RRC may not be the number of OFDMs serving as repetition unit, but the number of divisions. For example, when 2 is notified as the number of divisions, the control unit of the terminal device divides 10 OFDM symbols into two divisions, appends a CRC to every 5 OFDM symbols, and transmits by performing transmission repetition twice. Additionally, it may be that, the value related to the number of divisions or the number of OFDMs serving as repetition units may not be notified by the RRC parameter, but notified by a field in the DCI format for activating CS Type 2. Furthermore, a plurality of candidates (candidate sets) of the number of divisions (or the number of repetition units OFDM) may be notified via the RRC parameter; and, via a field in the DCI format for activating CS Type 2, the number of divisions set by the control unit of the device may be notified from the candidate set. Additionally, the received DCI format for releasing CS Type 2 may be valid when the field is set as the predetermined value (for example, all 0s or 1s), and the DCI may not be received correctly and discarded when the value is not the predetermined value. Furthermore, the number of divisions may be limited according to the number of OFDM symbols within the slot. For example, when the number of OFDM symbols in a slot is equal to or smaller than a predetermined value, the repetition within the slot may be invalidated. In other words, setting according to RRC signaling or the like may be invalidated.

Furthermore, the value related to the number of divisions or the number of OFDMs serving as repetition units may not be notified by the RRC parameter or the field in the DCI format for activating CS Type 2. For example, a field (for example, 1 bit) for notifying replacement may be set in the DCI format for activating CS. When the field is 0, repetition is performed according to the number of times set by the RRC parameter (repK) in consecutive slots. When the field is 1, the division is performed according to the RRC parameter (repK) within a slot, transport blocks may be generated for each of the divided OFDM symbols, and transmission repetition may be performed within the slot. Additionally, a field (for example, 1 bit) for notifying replacement may not be set in the DCI format, and the filed may be set via the RRC parameter. For example, when both the repK and the RRC parameter indicating the number of repetitions in the slot exist, only the RRC parameter indicating the number of repetitions in the slot is validated, and the repK is set to 1 and transmitted.

As described above, the base station device notifies the terminal device of the number of repetitions in a slot or the number of divisions in a slot. The present disclosure is not limited to this, and the notifying may not be performed, and the control unit of the terminal device does not use signaling from the base station. For example, when the number of OFDM symbols allocated in a slot is 10, the divisors of 10 are 1, 2, 5, and 10, and are set as the number of repetitions (the number of divisions), and the control unit of the terminal device may form a transmission signal. In this situation, the base station device performs a receiving process (demodulation and decoding processes) with the assumption that the number of repetitions (the number of divisions) is 1, 2, 5, and 10. When the CRC is passed, a positive determination is made and an ACK is transmitted to the terminal device. When the CRC does not pass, a positive determination is not made, and a NACK or DCI for retransmission is transmitted to the terminal device or nothing is transmitted.

The wireless transmission unit 2070 performs an IFFT (Inverse Fast Fourier Transform) on the multiplexed signal to generate an OFDM symbol. The wireless transmission unit 2070 appends a CP to the OFDM symbol to generate a baseband digital signal. Furthermore, the wireless transmission unit 2070 converts the baseband digital signal into an analog signal, removes undesirable frequency components, converts the baseband digital signal to a transmission frequency by up-conversion, amplifies power, and transmits the resulting signal to the base station device 10 via the transmission antenna 208.

The receiving unit 212 includes a wireless receiving unit (wireless receiving step) 2120, a demultiplexing unit (multiplexing/demultiplexing step) 2122, a transmission path estimation unit (channel estimating step) 2124, an equalization unit (equalizing step) 2126, a demodulation unit (demodulation step) 2128, and a decoding unit (decoding step) 2130.

The wireless receiving unit 2120 converts the downlink signal received via the receiving antenna 210 into a baseband signal by down-conversion, removes undesirable frequency components, suitably controls the amplification of the signal level, quadrature-demodulates based on the in-phase and quadrature components of the received signal, and converts the quadrature-demodulated analog signal into a digital signal. The wireless receiving unit 2120 performs FFT on the signal from which the CP has been removed, and extracts a signal in the frequency domain.

The demultiplexing unit 2122 separates the extracted frequency domain signal into a downlink reference signal, such as PDCCH, PDSCH, and PBCH. The transmission path estimation unit 2124 estimates frequency response (or characteristic curve) using a downlink reference signal (e.g., DM-RS). The frequency response results, which is estimated according to the transmission path and used for demodulating, is input to the equalization unit 1126. The transmission path estimation unit 2124 uses a downlink reference signal (e.g., CSI-RS) to measure the uplink channel status (Reference Signal Received Power, RSRP), RSRQ (Reference Signal Received Quality), RSSI (Received Signal Strength), RSSI (Received Signal Strength Indicator), and SINR (Signal to Interference plus Noise Power ratio). The measurement of the downlink channel condition is used for determining the MCS for the PUSCH and the like. The measurement results of the downlink channel status are used for determining a CQI index and the like.

The equalization unit 2126 generates equalization weightings based on the MMSE specification from the frequency response input from the transmission path estimation unit 2124. The equalization unit 2126 multiplies the input signal (PUCCH, PDSCH, PBCH, etc.) from the demultiplexing unit 2122 according to the equalization weightings. The demodulation unit 2128 performs a demodulation process based on information of a predetermined modulation order/a modulation order instructed by the control unit 204.

The decoding unit 2130 performs a decoding process on the output signal of the demodulation unit 2128 based on information of a predetermined coding rate/coding rate information indicated by the control unit 204. The decoding unit 2130 outputs the decoded data (e.g., DL-SCH) to the higher layer processing unit 202.

Second Implementation

In the first implementation, the following situation was disclosed, specifically that transmission repetition in a slot, the number of OFDM symbols set in a time domain allocation and the number of OFDM symbols (or the number of divisions) serving as repetition units set in the RRC signaling are not mutually exclusive. In the second implementation, the following situation is disclosed, specifically that the number of OFDM symbols set by time domain allocation and the number of OFDM symbols (or the number of divisions) serving as repetition units set by RRC signaling are mutually exclusive.

Figure 5:
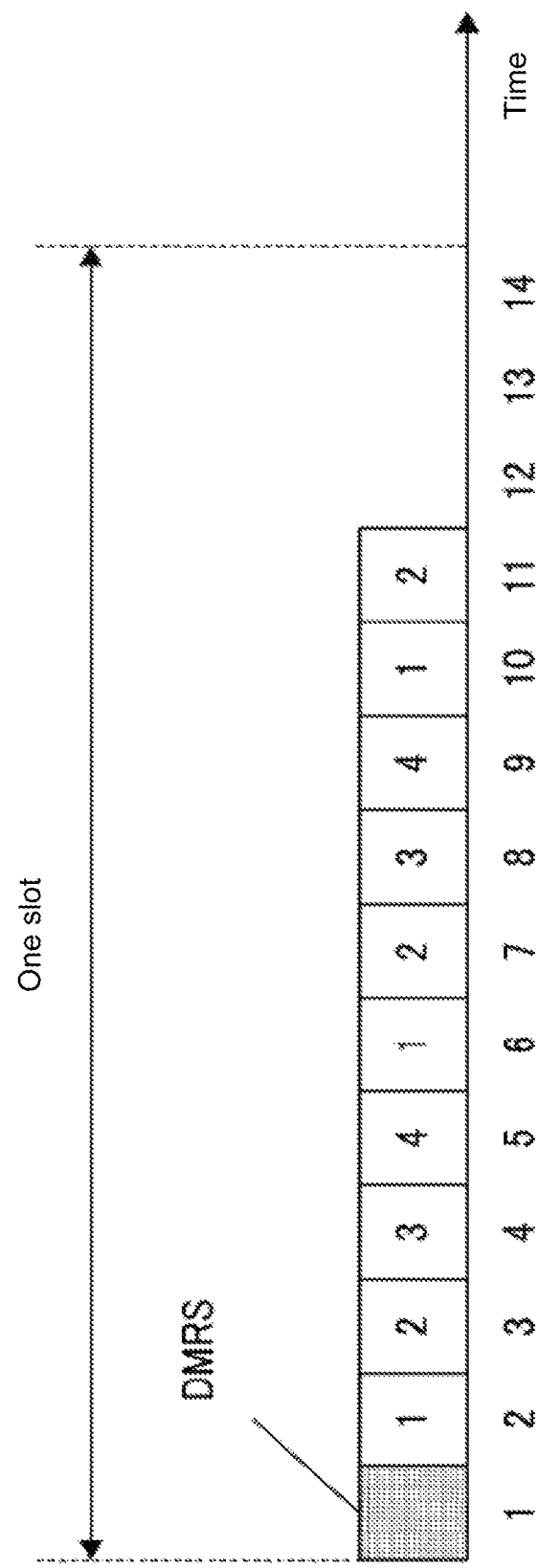
FIG. 5 is a slot schematic diagram illustrating the number of OFDM symbols in a slot is 10 and a repetition unit is 4 according to a second aspect of the present disclosure.

In FIG. 5, the number of OFDM symbols set in the time domain allocation is 10, and the number of OFDM symbols serving as repetition units is 4. As illustrated in FIG. 5, the second OFDM symbol to the fifth OFDM symbol are used for the first transmission of the transport block, and the sixth OFDM symbol to the ninth OFDM symbol are used for the second transmission of the transport block. In the tenth OFDM symbol, the same OFDM symbol as the second and sixth OFDM symbols is transmitted. In the eleventh OFDM symbol, the same OFDM symbol as the third and seventh OFDM symbols is transmitted. In this way, when a number of OFDMs that is smaller than the number of OFDM symbols serving as repetition units exist in a slot, transmission is repeated up to the allocated number of OFDM symbols. However, different scrambling may be applied. Furthermore, in the above disclosure, transmission in the slot is repeated up to the allocated number of OFDM symbols; however, the present disclosure is not limited to this. For example, in the above example, in the tenth and the eleventh OFDM symbols, the number of OFDM symbols serving as repetition units may not be determined. Therefore, the control unit of the terminal device may not transmit the tenth and eleventh OFDM symbols. Furthermore, there may be no transmission. Instead, the CP length for some or all of the OFDM symbols in the slot may be changed to adjust the remainder obtained by dividing the number of OFDM symbols in the slot by the number of OFDM symbols serving as repetition units to 0. The CP length may also be set via RRC signaling or DCI format.

Furthermore, when the number of OFDM symbols serving as repetition units, such as the tenth and eleventh OFDM symbols, cannot be transmitted completely, the above-disclosed OFDM symbols serving as repetition units are transmitted first, or the last OFDM symbol may be transmitted first. For example, in the tenth OFDM symbol, the same OFDM symbol as the fourth and eighth OFDM symbols may be transmitted, and in the eleventh, the same OFDM symbol as the fifth and ninth OFDM symbols may be transmitted. Furthermore, transmission may be performed according to whether the RRC parameter (or the value in the predetermined field in the DCI format for activating CS Type 2) is notified from the base station device to the terminal device by transmitting an OFDM symbol sequence serving as a repetition unit from the start or transmitting the last OFDM symbol. Additionally, in the repetition within a slot, the OFDM symbol sequence serving as a repetition unit may not be transmitted at the end of the repetition, may be transmitted at the start, or may be set as any repetition. Furthermore, the setting may be notified from the base station device to the terminal device by RRC signaling or a DCI format.

In the above disclosure, the following situation is disclosed, specifically when the end of a repetition within a slot does not match the allocated OFDM symbol, the same OFDM symbol is transmitted for each repetition. However, the present disclosure is not limited to this. At the end (or the start) of a repetition, the repeating unit may be changed. For example, if the number of OFDM symbols set in the time domain allocation is 10 and the number of OFDM symbols serving as repetition units is 4, the coding rate in the last 2 OFDM symbols is decreased and the coding rate required for decoding is transmitted. Furthermore, instead of the last two OFDM symbols, six OFDM symbols including the immediately preceding repetition may be used, and the coding rate may be compared with other repetitions to increase the likelihood of data transmission.

In the present disclosure, an implementation method is disclosed for when the number of OFDM symbols set by time domain allocation and the number of OFDM symbols (or the number of divisions) serving as repetition units set by RRC signaling are mutually exclusive. However, the above problem may be avoided by setting the base station devices such that they are not mutually exclusive. Alternatively, when the terminal device is notified of mutually exclusive signaling, the terminal device may not perform transmission based on CS.

Third Implementation

One of the CS RRC parameters is a parameter related to frequency hopping. In the present disclosure, the implementation related to frequency hopping is disclosed.

Figure 6:
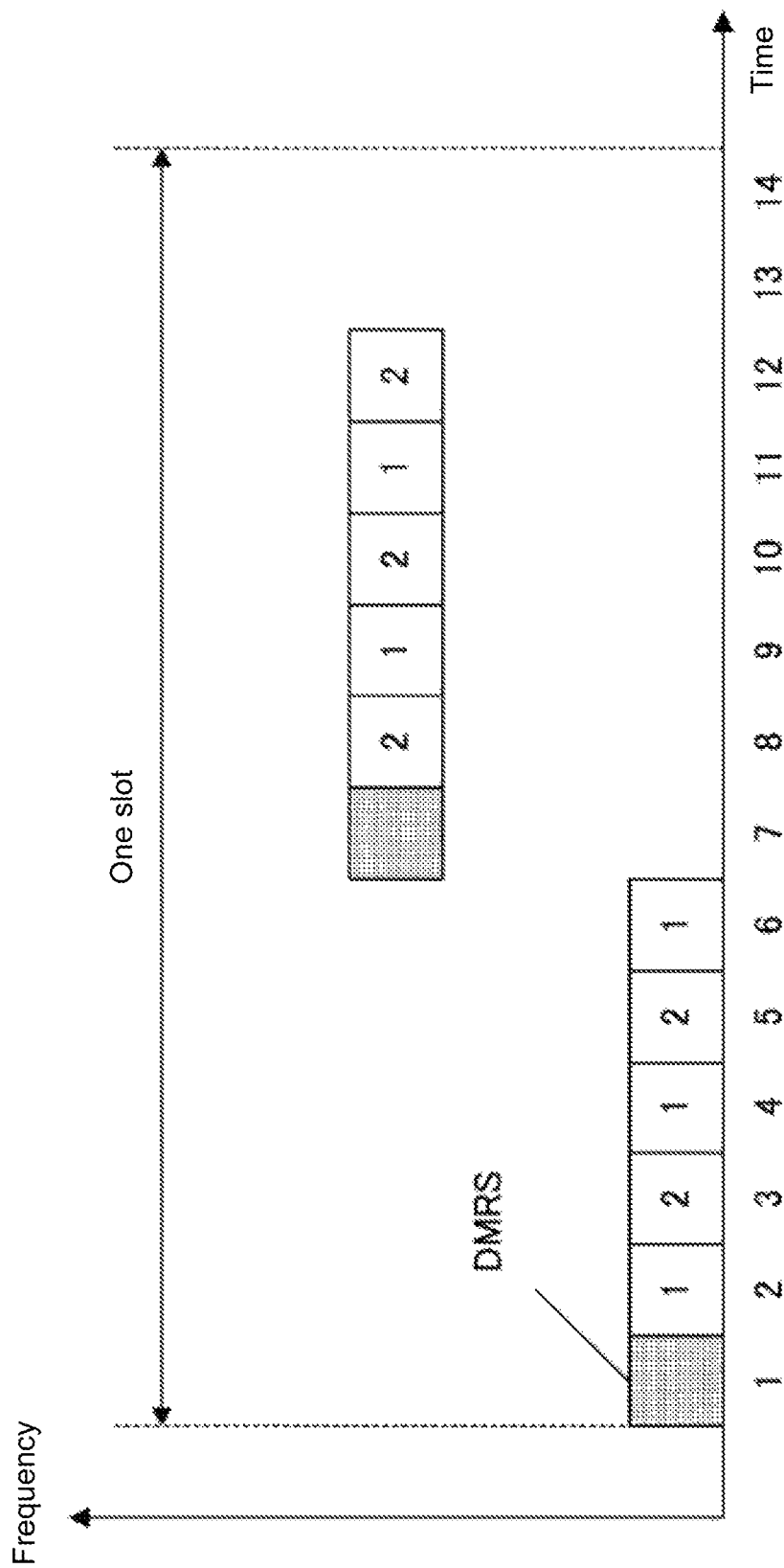
FIG. 6 is a slot schematic diagram illustrating frequency hopping according to a third aspect of the present disclosure.

FIG. 6 is a slot schematic diagram illustrating frequency hopping according to a third aspect of the present disclosure. As illustrated in FIG. 6, when the signal is divided by frequency hopping in the middle of a repetition unit, the signal after frequency hopping is transmitted from the middle of the repetition unit. However, when a setting using the RRC parameter exists, the transmission may not be performed from the middle, but performed from the start of the repetition unit.

Herein, the RRC parameters related to the number of repetitions within a slot (or the number of repetition units of OFDM symbols) is disclosed. For example, when an RRC parameter related to frequency hopping is set and indicates a valid value (for example, Mode 1, Mode 2), the parameter related to the number of repetitions within a slot indicates a repetition number in the frequency hopping unit (mini-slot; a unit shorter than a slot). Furthermore, the number of repetitions within a slot may always be indicated without relying on the RRC parameter related to frequency hopping, or may be notified via RRC signaling or the like. The above disclosure may also be applied within a frequency hopping unit.

The program that operates on the device according to the present disclosure may be a program that controls a Central Processing Unit (CPU), and cause a computer to realize the functions of the above-disclosed implementation according to the present disclosure. The program or information handled by the program may be temporarily read into a volatile memory such as a Random Access Memory (RAM) during processing, or stored in a non-volatile memory such as a flash memory or a Hard Disk Drive (HDD), and is read, corrected and written by the CPU as required.

Additionally, a part of the device may be realized by a computer. A program for implementing the functions of the disclosed implementations may be recorded on a computer-readable storage medium. The program may be realized by causing a computer system to read and execute the program recorded on the recording medium. Herein, the "computer system" is a computer system built in the device, and includes an operating system and hardware such as peripheral devices. Furthermore, the "computer-readable storage medium" may be any of a semiconductor storage medium, an optical storage medium, a magnetic storage medium, and the like.

Furthermore, a "computer-readable storage medium" may include: a medium that dynamically stores a program for a short time, such as a communication line for transmitting a program through a network like the Internet or a telephone line. In this situation, a program holding a program for a certain period of time, such as a volatile memory in a computer system serving as a server or a client, may also be included. Furthermore, the above-disclosed program may be for realizing a part of the above-disclosed functions, or may be for realizing the above-disclosed functions in combination with a program that is already recorded in a computer system.

Furthermore, various characteristics or function modules used in the equipment disclosed herein may be installed or implemented by electronics or circuits such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

It is noted that, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, other home appliances, terminal devices or communications devices.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, and implementations suitably combining various disclosed implementations. Additionally, the disclosed implementations may have component substitutions that have similar effect.

INDUSTRIAL APPLICABILITY

The present disclosure is suitable for base station devices, terminal devices and communication methods thereof.

The invention claimed is:

1. A terminal device for performing communication with a base station device, the terminal device comprising:
one or more processors; and
at least one memory coupled to the one or more processors, the at least one memory storing one or more computer-executable instructions that, when executed by the one or more processors, cause the terminal device to:
receive, via Radio Resource Control (RRC) signaling or Downlink Control Information (DCI), first information related to an Orthogonal Frequency Division Multiplexing (OFDM) symbol allocation for a Physical Uplink Shared Channel (PUSCH), second information related to repetitions of the PUSCH, and third information related to frequency hopping of the PUSCH;
perform one or more of the repetitions of the PUSCH, each of the one or more of the repetitions of the PUSCH having a first duration determined based on at least one of the first information and the second information; and
perform the frequency hopping of the PUSCH at a start of each of the one or more of the repetitions of the PUSCH based on the third information.

2. The terminal device of claim 1, wherein the one or more of the repetitions of the PUSCH are performed by using a number of remaining OFDM symbols available for the one or more of the repetitions of the PUSCH when a second duration of the number of remaining OFDM symbols is shorter than the first duration.

3. The terminal device of claim 1, wherein a number of the one or more of the repetitions of the PUSCH within a slot is determined based on the second information.

4. A wireless communication method performed by a terminal device, the wireless communication method comprising:
receiving, via Radio Resource Control (RRC) signaling or Downlink Control Information (DCI), first information related to an Orthogonal Frequency Division Multiplexing (OFDM) symbol allocation for a Physical Uplink Shared Channel (PUSCH), second information related to repetitions of the PUSCH, and third information related to frequency hopping of the PUSCH;
performing one or more of the repetitions of the PUSCH, each of the one or more of the repetitions of the PUSCH having a first duration determined based on at least one of the first information and the second information; and
performing the frequency hopping of the PUSCH at a start of each of the one or more of the repetitions of the PUSCH based on the third information.

5. The wireless communication method of claim 4, wherein the one or more of the repetitions of the PUSCH are performed by using a number of remaining OFDM symbols available for the one or more of the repetitions of the PUSCH when a second duration of the number of remaining OFDM symbols is shorter than the first duration.

6. The wireless communication method of claim 4, wherein a number of the one or more of the repetitions of the PUSCH within a slot is determined based on the second information.

* * * * *